Sept. 22, 1959  C. A. JUDSON ET AL  2,905,326
FILTERS
Filed July 31, 1956  2 Sheets-Sheet 1
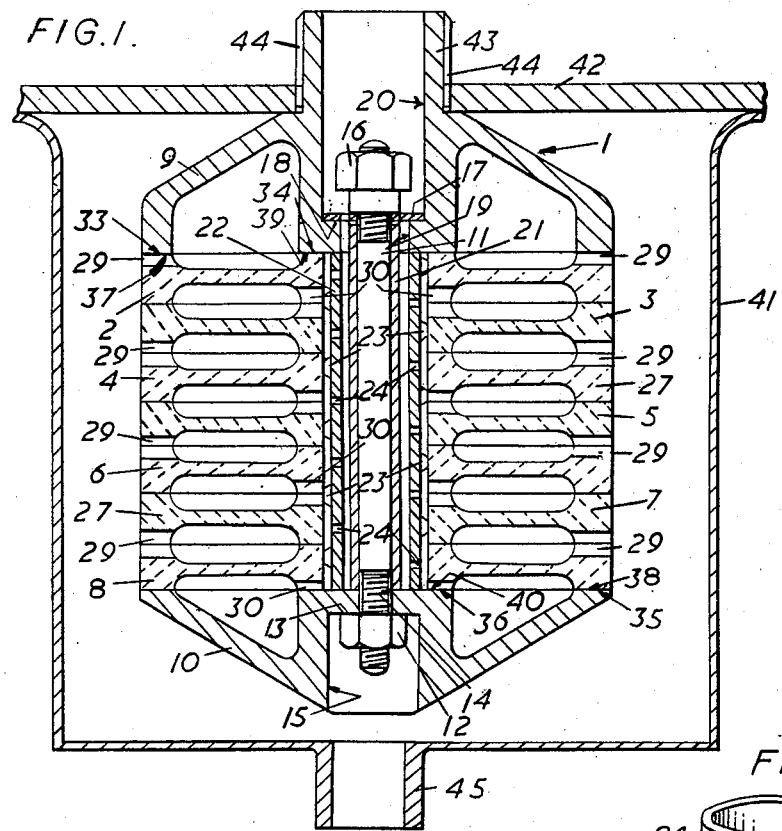
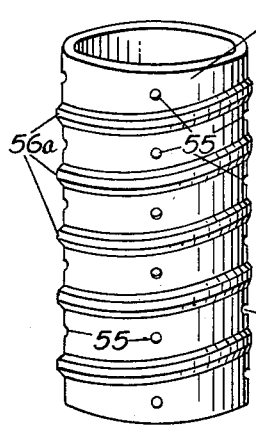
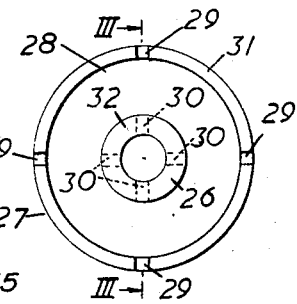
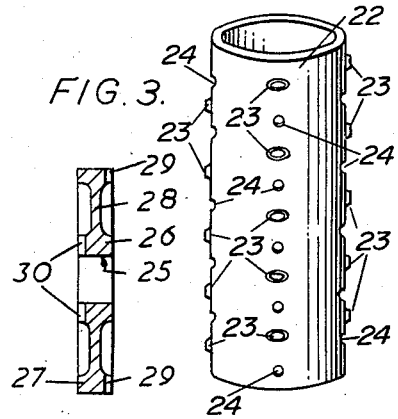
Inventors
Charles Alan Judson
George McLeith Collins
By
Attorneys Sept. 22, 1959     C. A. JUDSON ET AL     2,905,326
FILTERS
Filed July 31, 1956     2 Sheets-Sheet 2
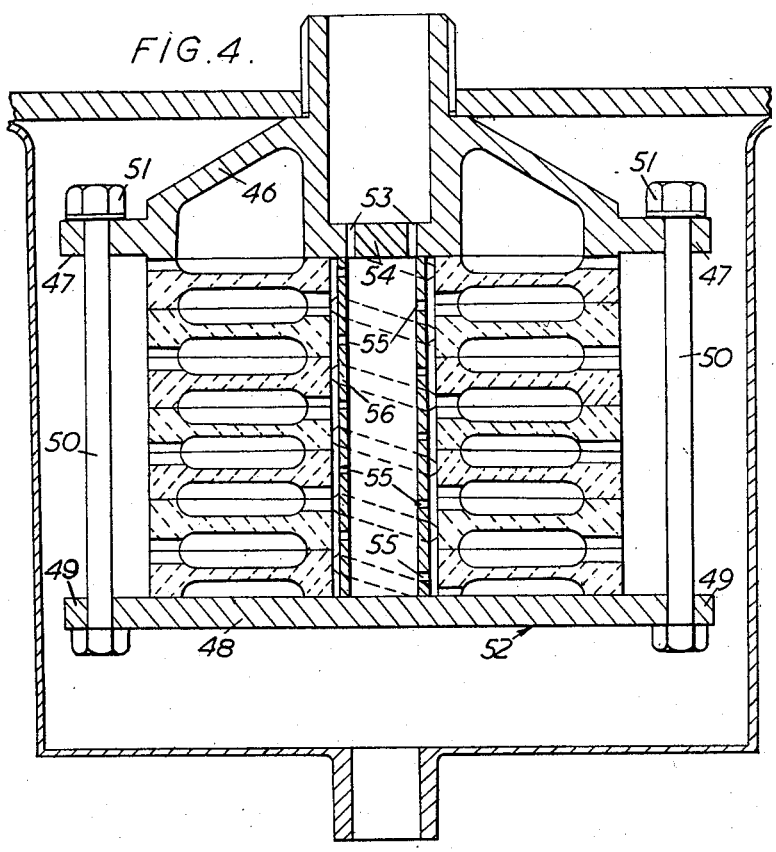
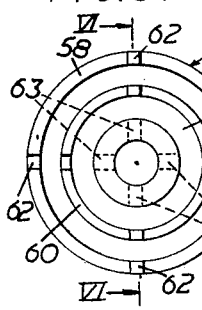 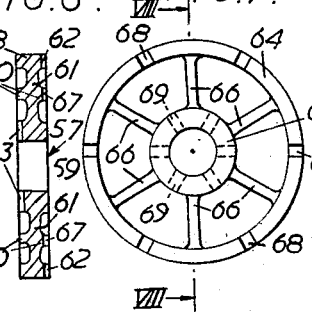 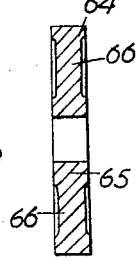
Inventors
Charles Alan Judson
George McLeod Collins
By
                 Attorneys.

United States Patent Office 2,905,326
Patented Sept. 22, 1959

2,905,326

FILTERS

Charles Alan Judson, Solihull, and George McLeish Collins, Small Heath, Birmingham, England, assignors to The Birmingham Small Arms Company Limited, Birmingham, England, a British company Application July 31, 1956, Serial No. 601,295

Claims priority, application Great Britain August 17, 1955

8 Claims. (Cl. 210—457)

This invention relates to filters in which the filtering medium consists of plates of porous metal formed by powder metallurgy methods, an example of which is disclosed in British Patent No. 686,129. Such porous metal plates form an excellent filtering medium, because of the control of their porosity arising from the method of manufacture, and they may, moreover, be made of metals capable of strongly resisting the corrosive action of many fluids that may require to be filtered. It is, however, highly important that there should be no leakage, and a filter construction involving the provision of joints needing jointing material is seriously limited in its application because of the lack of jointing material capable of withstanding the action of many of the fluids to be filtered. In addition, the porous metal plates have relatively low strength, so that they may not be capable of transmitting the pressure necessary to complete a tight joint containing jointing material. For this reason, welding or metal-spraying has been used to join the porous sheets to each other, or to non-porous sheets or parts of like corrosion-resistant metal, but this imposes a limitation on the filter construction (e.g. by not permitting ready dismantling, as may be desirable for cleaning), and also involves considerable skill in making satisfactory joints.

The object of the invention is to provide a filter using powder metal filter elements of simple form capable of being assembled and reassembled without the need for jointing material between themselves or other parts of the filter.

According to the present invention, a filter has an assembly of co-axial elements fitted to each other centrally and peripherally by faces normal to the axis, one at least of the elements being of powder metal and including a filter plate extending normally to the axis between the centre and the periphery, together with non-porous end elements making a similar central and peripheral fit, means for clamping all the elements by axial pressure, an inlet to one side of the or each filter plate element, and an outlet from the other side of the or each filter plate element.

The fitting faces may be accurately ground or finished to provide plane surfaces that do not require any jointing compound. The clamping pressure being axial, the powder metal element or elements is or are subjected only to simple compression, applied uniformly round each fitting face. If the fitting faces on any given side of the element are in the same plane without any projections above this plane, then finishing or surface grinding may be easily carried out.

The filter may consist solely of a filter plate element or elements of powder metal, and two end elements, in which case the inlet and outlet of the or any one filter plate element may be formed in the element itself at opposite sides of the filter plate of the element. Where more than one filter plate element is provided, they may be identical, and assembled alternately with the inlet of one facing in an opposite axial direction to that of the next, and similarly with the outlets, so that one filter plate has a common inlet with the adjoining filter plate at one side and a common outlet with the adjoining filter plate at the other side.

Again, where more than one filter plate element is provided, filter plate elements between end elements may be separated from each other by elements alternately providing common inlets to adjoining plates and common outlets to adjoining plates.

The outlets (or inlets as the case may be) are conveniently near the axis of the assembly, in the form of ports communicating with axial or radial and axial passages in an annular member on which the elements are assembled, the axial passages forming supply or outflow passages. A rod within the annular member may be screwed and fitted with nuts for clamping the elements between the end elements. Alternatively, the said radial and axial passages may be provided in the rod itself, in which case the annular member is dispensed with. The inlets (or alternatively the outlets) may be distributed round the periphery of the assembly, preferably with uniform spacing. Alternatively, the centre rod may be omitted and a number of suitably spaced bolts or studs used to provide the joint load. The annular member may be provided with either a coarse helical thread or circumferential grooves or ribs combined with axial slots on outer surfaces, or simply with spacing lugs so that the filter plates or spacers may be assembled without any particular angular relationship.

In addition to the central and peripheral fitting faces of the or each filter plate element and the end elements, there may also be a further fitting face or faces provided intermediate the centre and periphery.

In the accompanying more or less diagrammatic drawings—

Figure 1 is a side view in medial section of one construction of filter in accordance with the invention, Figure 2 is a plan view of a detail, and Figure 3 is a side view in section on line III to III of Figure 2.

Figures 2 and 3 are drawn to a smaller scale than that of Figure 1.

Figure 4 is a side view in medial section, and illustrates another construction, Figure 5 is a plan view of a detail and illustrates a further construction, Figure 6 is a side view in section on line VI to VI of Figure 5, Figure 7 is a plan view of a detail and illustrates a still further construction, and Figure 8 is a side view in section on line VIII to VIII of Figure 7.

Figures 5 to 8 are drawn to a smaller scale than that of Figures 1 and 4.

Figures 9 and 10 are enlarged detail perspective views of the central portions of the filter according to Figures 1 and 4, respectively.

Referring to the drawings, in the construction shown in Figures 1 to 3 thereof, a filter has an assembly 1 of co-axial filter-plate elements 2, 3, 4, 5, 6, 7 and 8, clamped between end elements 9 and 10 respectively. A central rod 11 which is screwthreaded at both its ends has a nut 12 screwed to its lower end and bearing on a shoulder 13 formed in the end element 10 by an aperture 14 for the rod and a hole 15 of larger diameter than and co-axial with the aperture 14. The upper end of the rod 11 has a nut 16 screwed on to it and bearing, through a perforate washer 17, on a shoulder 18 formed in the end element 9 by a clearance aperture 19 and a hole 20 of larger diameter than and co-axial with the aperture 19. The rod 11 is embraced by an annular sleeve 21 whose upper end is accommodated with clearance in the aperture 19. The sleeve 21 has surrounding it with clearance an annular sleeve 22 having a plurality of locating lugs 23 on its external periphery and a series of radial passages 24 through it, as shown in Figures 1 and 9. Instead of lugs 23, the sleeve 22 may have a coarse-pitch helical rib as hereinafter described. The lugs 23 or helical rib serve to locate the elements 2 to 8 so that a passage is provided between the sleeve 22 and the elements 2 to 8. Each of the elements 2 to 8, one of which is shown in Figures 2 and 3, has a central aperture 25 in a hub portion 26, and has a peripheral rim 27 joined to the hub portion 26 by a web 28. Spaced radial apertures 29 are formed in the rim 27 on one side of each element, and spaced radial apertures 30 are formed in the hub portion 26 on that side of each element which is remote from the side on which the apertures 29 are formed. Opposed rim faces 31 and hub faces 32 of the elements 2 to 8 are machined, ground or otherwise finished so that the elements are peripherally and centrally fitted on clamping of the elements together axially. Furthermore, the outer rim face 33 and hub face 34 of the element 2 and the outer rim face 35 and hub face 36 of the element 8 are machined, ground or otherwise finished so that they are peripherally and centrally fitted with machined, ground or otherwise finished peripheral faces 37, 38 and hub faces 39, 40 of the end elements 9 and 10 respectively, it being of course understood that the apertures 29 and 30 form alternating peripheral and central passages respectively between adjacent elements and between the outer elements 2, 8 and the respective end elements 9, 10.

The filter elements 2 to 8 are of powder metal and are of controlled porosity. The end elements 9, 10 are of non-porous metal. The assembly 1 is contained in a cylindrical container 41 which has a removable upper end 42 fitting closely about a neck 43 of the end element 9 in which the aperture 20 is formed. The neck 43 may have splines 44, as shown in Figure 1, for assisting in the making of a fluid-tight joint between the assembly 1 and a supply or outlet pipe, not shown. The container 41 has a union 45 for connection to an outlet or supply pipe, not shown.

In use, fluid for filtering is fed to the filter either to the neck 43 or to the union 45. Where it is fed to the neck 43, it flows through the passage formed by the walls of the aperture 20, through the perforations of the washer 17, through the passage formed between the sleeve 21 and the clearance aperture 19, and into the passage formed by the clearance between the sleeves 21 and 22. From thence it passes via the radial passages 24 to the passage between the sleeve 22 and the elements 2 to 8. The fluid can pass to the container 41 and out via the union 45 only by passing through the material of at least one of the filter elements 2 to 8, and in so doing is filtered. Where the fluid is fed to the union 45, it enters the container 41 and can only escape therefrom by passing through at least one of the filter elements 2 to 8. If it enters the assembly 1 via one or more of the apertures 29, it must pass through a web 28 and an aperture 30, or through a hub portion 26 to reach the passage between the sleeve 22 and the elements 2 to 8 and pass from thence to the neck 43 in reverse to the manner above described.

In another construction, shown in Figure 4, the filter assembly is similar to that described with reference to Figures 1 to 3, except that, instead of employing a central rod for clamping the filter plate elements together and to the end elements, the end elements have external means for applying the necessary clamping pressure. Referring to Figure 4, an upper end element 46 has four external lugs 47, two of which are shown in Figure 4, and a lower end element 48 has four external lugs 49, two of which are shown in Figure 4. Headed bolts 50 each provided with a nut 51 engage registering lugs 47 and 49, and serve for application of the necessary clamping pressure.

Other respects in which the assembly 52 differs from the assembly 1, are that the inner sleeve 21, central rod 11 and perforate washer 17 of the assembly 1 are omitted, and the aperture 19 of the end element 9 of the assembly 1 is replaced by perforations 53 in a central wall 54 of the end element 46. Fluid can pass directly either to or from radial passages 55 in a sleeve 56, corresponding to passages 24 in the sleeve 22 of the assembly 1, and enter or leave the assembly 52 through the perforations 53. A helical rib 56a surrounds the sleeve 56 for locating the assembly of filter plates thereon.

In another construction of filter plate element, shown in Figures 5 and 6 and suitable for use with either of the filter assemblies hereinbefore described, the element 57 is similar to the elements 2 to 8 of the assembly 1, except that in addition to a peripheral rim 58 and a hub portion 59, it has an intermediate annular rib 60 extending on both sides of the web 61 joining the rim 58 to the portion 59. The rim is provided with apertures 62 and the hub portion 59 with opposed apertures 63 as in the elements 2 to 8 of the assembly 1. The rib 60 is preferably provided with apertures 67 aligned with the apertures 62 and 63 and on the same side of the element as the apertures 62. Alternatively, the rib 60 may be unapertured (not shown) thereby presenting a further filtering medium to fluid. The apertures 67, where provided, may alternatively be staggered, that is, not aligned with the apertures 62 and 63 (not shown).

In a further construction of filter plate element, shown in Figures 7 and 8, in addition to a peripheral rim 64 and a hub portion 65, the web joining the rim and hub portion is partly constituted by radial spoke-like reinforcement parts 66, each part 66 being of less thickness than the rim 64 and portion 65. The rim 64 and the portion 65 have opposed apertures 68 and 69 respectively, similar to the apertures 29, 30 and 62, 63 respectively, of the hereinbefore described constructions, and spaced intermediate the parts 66.

It will be appreciated that filters according to the invention are readily demountable, e.g. for cleaning and can be as readily assembled or reassembled.

We claim:

1. In a filter, in combination, a plurality of co-axial elements comprising two non-porous end elements and a plurality of intermediate elements comprising filter plates of porous metal formed by powder metallurgy, central and peripheral faces of said elements being co-planar whereby said elements can be fitted to one another centrally and peripherally, a filter plate of each intermediate element extending between the centre and the periphery, and means for clamping the elements together by axial pressure, each intermediate element having a passage communicating with the filter plate from the periphery of the element and disposed on one side of the element and a passage communicating with the filter plate from the centre of the element and disposed on the other side of the element whereby on assembly of the intermediate elements alternately with peripheral passages facing in opposite axial directions and similarly with the central passages, one filter plate has communicating with it a common peripheral passage with the adjoining filter plate at one side, and has communicating with it a common central passage with the adjoining filter plate at the other side.

2. In a filter, in combination, a plurality of co-axial elements comprising two non-porous end elements, and a plurality of intermediate elements similar to one another and comprising filter plates of porous metal formed by powder metallurgy, central and peripheral rim faces of said elements being co-planar whereby said elements can be fitted to one another centrally and peripherally, a powder metal filter plate of each intermediate element extending between the central and peripheral rims, a central annular member on which the elements are assembled and having radial passages therethrough and axial passages inside and outside thereof, and means for clamping the elements together on said annular member by axial pressure, each intermediate element having on the one side a passage communicating between the outer axial passage of the annular member and the filter plate and on the other side a passage communicating between the filter plate and the outside of the assembly of elements, the intermediate elements being disposable in alternately facing axial directions.

3. In a filter, in combination, a plurality of co-axial elements comprising two non-porous end elements, and a plurality of intermediate elements similar to one another comprising filter plates of porous metal formed by powder metallurgy, central and peripheral rim faces of said elements being co-planar whereby said elements can be fitted to one another centrally and peripherally, a powder metal filter plate of each intermediate element extending between the central and peripheral rims, a central annular member on which the elements are assembled and having radial passages therethrough and axial passages inside and outside thereof, a central rod within and spaced from said annular member, and means for releasably securing said rod to said end elements for clamping the elements axially together on said annular member, each intermediate element having on the one side a passage communicating between the outer axial passage of the annular member and the filter plate and on the other side a passage communicating between the filter plate and the outside of the assembly of elements, the intermediate elements being disposable in alternately facing axial directions.

4. In a filter, in combination, a plurality of co-axial elements comprising two non-porous end elements, and a plurality of intermediate elements similar to one another and comprising filter plates of porous metal formed by powder metallurgy, central and peripheral rim faces of said elements being co-planar whereby said elements can be fitted to one another centrally and peripherally, a powder metal filter plate of each intermediate element extending between the central and peripheral rims, a central annular member on which the elements are assembled and having radial passages therethrough and axial passages inside and outside thereof, a plurality of bolts, external parts of said end elements, and means for releasably securing said bolts to said parts for clamping the elements axially together on said annular member each intermediate element having on the one side a passage communicating between the outer axial passage of the annular member and the filter plate and on the other side a passage communicating between the filter plate and the outside of the assembly of elements, the intermediate elements being disposable in alternately facing axial directions.

5. In a filter, in combination, a plurality of co-axial elements comprising two non-porous end elements, and a plurality of intermediate elements similar to one another and comprising filter plates of porous metal formed by powder metallurgy, central and peripheral rim faces of said elements being co-planar whereby said elements can be fitted to one another centrally and peripherally, a powder metal filter plate of each intermediate element extending between the central and peripheral rims, a central sleeve having radial passages therethrough, radial external projections of said sleeve for engagement with and location of said intermediate elements mountable axially on said sleeve for providing a passage between said sleeve and said intermediate elements, and means for clamping said elements together on said sleeve by axial pressure, each intermediate element having on the one side a passage communicating between the filter plate and the passage between said sleeve and said intermediate elements and on the other side a passage communicating between the filter plate and the outside of the assembly of elements, the intermediate elements being disposable in alternately facing axial directions.

6. In a filter, an assembly according to claim 5, wherein said radial external projections comprise axially and peripherally spaced lugs.

7. In a filter, an assembly according to claim 5, wherein said radial external projections comprise a coarse-pitch helical rib.

8. In a filter, in combination, a plurality of co-axial elements comprising two non-porous end elements, and a plurality of intermediate elements similar to one another and comprising filter plates of porous metal formed by powder metallurgy, central, peripheral and intermediate plane rim faces on said elements whereby said elements can be fitted to one another centrally peripherally and intermediately, powder metal filter plates of the intermediate element extending between the central, intermediate and peripheral rims, a central annular member on which the elements are assembled and having radial passages therethrough and axial passages inside and outside thereof, and means for clamping the elements together on said annular member by axial pressure, each intermediate element having on the one side a passage communicating between the outer axial passage and a filter plate and on the other side a passage communicating between a filter plate and the outside of the assembly of elements together with a passage through said intermediate rim, the intermediate elements being disposable in alternately facing axial directions.

References Cited in the file of this patent

UNITED STATES PATENTS

| 1,643,299 | Furness | Sept. 27, 1927 |
| 2,220,641 | Davis | Nov. 5, 1940 |
| 2,313,612 | Alsop | Mar. 9, 1943 |
| 2,627,351 | Ogden | Feb. 3, 1953 |
| 2,788,128 | Heine | Apr. 9, 1957 |

FOREIGN PATENTS

| 331,961 | Germany | Sept. 22, 1917 |